United States Patent
Sun et al.

(10) Patent No.: US 11,720,110 B2
(45) Date of Patent: Aug. 8, 2023

(54) DYNAMIC OBSTACLE AVOIDANCE METHOD BASED ON REAL-TIME LOCAL GRID MAP CONSTRUCTION

(71) Applicant: Anhui University, Hefei (CN)

(72) Inventors: Changyin Sun, Hefei (CN); Qiaoyun Wu, Hefei (CN); Lu Ren, Hefei (CN)

(73) Assignee: Anhui University, Hefei (CN)

( * ) Notice: Subject to any disclaimer, the term of this patent is extended or adjusted under 35 U.S.C. 154(b) by 0 days.

(21) Appl. No.: 18/147,484

(22) Filed: Dec. 28, 2022

(65) Prior Publication Data
US 2023/0161352 A1    May 25, 2023

(30) Foreign Application Priority Data

Mar. 23, 2022    (CN) .......................... 202210284948.9

(51) Int. Cl.
  G05D 1/00    (2006.01)
  G05D 1/02    (2020.01)
(52) U.S. Cl.
  CPC ......... *G05D 1/0214* (2013.01); *G05D 1/0088* (2013.01); *G05D 1/024* (2013.01);
  (Continued)
(58) Field of Classification Search
  CPC .. G05D 1/0214; G05D 1/0088; G05D 1/0221; G05D 1/024; G05D 1/0248; G05D 1/0274
  See application file for complete search history.

(56) References Cited

U.S. PATENT DOCUMENTS

| 10,810,445 | B1 | 10/2020 | Kangaspunta |
| 2019/0286145 | A1 | 9/2019 | LaFary et al. |

(Continued)

FOREIGN PATENT DOCUMENTS

| CN | 105487535 A | 4/2016 |
| CN | 105843223 A | 8/2016 |

(Continued)

OTHER PUBLICATIONS

Zhaoyang Yang, Kathryn Merrick, Lianwen Jin, and Hussein A. Abbass, Hierarchical Deep Reinforcement Learning for Continuous Action Control, 2018, IEEE Transactions on Neural Networks and Learning Systems, vol. 29, No. 11, Nov. 2018 (Year: 2018).*

(Continued)

*Primary Examiner* — Behrang Badii
*Assistant Examiner* — Matthew J. Reda

(57) ABSTRACT

A dynamic obstacle avoidance method based on real-time local grid map construction includes: acquiring and inputting Red-Green-Blue-RGBD image data of a real indoor scene into a trained obstacle detection and semantic segmentation network to extract obstacles of different types and semantic segmentation results in the real indoor scene and generate 3D point cloud data with semantic information; according to the 3D point cloud data, extracting and inputting state information of a dynamic obstacle to a trained dynamic obstacle trajectory prediction model, and predicting a dynamic obstacle trajectory in the real indoor scene to build a local grid map; and based on a dynamic obstacle avoidance model, sending a speed instruction in real time to the mobile robot to avoid various obstacles during the navigation process.

4 Claims, 3 Drawing Sheets
(1 of 3 Drawing Sheet(s) Filed in Color)

(52) U.S. Cl.
CPC ......... *G05D 1/0221* (2013.01); *G05D 1/0248* (2013.01); *G05D 1/0274* (2013.01)

(56) References Cited

U.S. PATENT DOCUMENTS

| | | | | |
|---|---|---|---|---|
| 2021/0136993 | A1* | 5/2021 | Revelli | G05D 1/0088 |
| 2021/0365038 | A1* | 11/2021 | Ma | G06V 20/588 |
| 2022/0317696 | A1* | 10/2022 | Takeshita | G06N 3/082 |

FOREIGN PATENT DOCUMENTS

| | | |
|---|---|---|
| CN | 106681330 A | 5/2017 |
| CN | 108319655 A | 7/2018 |
| CN | 109341707 A | 2/2019 |
| CN | 109871021 A | 6/2019 |
| CN | 110275540 A | 9/2019 |
| CN | 111337941 A | 6/2020 |
| CN | 111665842 A | 9/2020 |
| CN | 112802204 A | 5/2021 |
| CN | 112859859 A | 5/2021 |
| CN | 113110457 A | 7/2021 |
| CN | 113359717 A | 9/2021 |
| CN | 113934207 A | 1/2022 |

OTHER PUBLICATIONS

Yaokun Tang, Qingyu Chen, and Yuxin Wei, Robot Obstacle Avoidance Controller Based on Deep Reinforcement Learning, 2022, Hindawi Journal of Sensors vol. 2022, Article ID 4194747 (Year: 2022).*

Wen-Da Jin, Jun Xu, Qi Han, Yi Zhang, and Ming-Ming Cheng, CDNet: Complementary Depth Network for RGB-D Salient Object Detection, 2021, IEEE Transactions on Image Processing, vol. 30, 2021 (Year: 2021).*

Xuehao Sun, Shuchao Deng, and Baohong Tong, Trajectory Planning Approach of Mobile Robot Dynamic Obstacle Avoidance with Multiple Constraints, 2021 6th IEEE International Conference on Advanced Robotics and Mechatronics Jul. 3-5, 2021, Chongqing, China (Year: 2021).*

Guangda Chen, Lifan Pan, Yu'an Chen, Pei Xu, Zhiqiang Wang, Peichen Wu, Jianmin Ji, and Xiaoping Chen, Robot Navigation with Map-Based Deep Reinforcement Learning, 2020, 2020 IEEE International Conference on Networking, Sensing and Control (ICNSC) (Year: 2020).*

* cited by examiner

DYNAMIC OBSTACLE AVOIDANCE METHOD BASED ON REAL-TIME LOCAL GRID MAP CONSTRUCTION

CROSS-REFERENCE TO RELATED APPLICATIONS

This application claims the benefit of priority from Chinese Patent Application No. 202210284948.9, filed on Mar. 23, 2022. The content of the aforementioned application, including any intervening amendments thereto, is incorporated herein by reference in its entirety.

TECHNICAL FIELD

This application relates to mobile robot navigation, and more particularly to a dynamic obstacle avoidance method based on real-time local grid map construction.

BACKGROUND

Obstacle avoidance is indispensable for the mobile robot navigation. With the development of sensor technology and robotics theory, there are solutions available for mapping, localization and obstacle avoidance of the mobile robots in ordinary and simple indoor environment. However, considering that the existing mobile robot navigation systems are usually unaware of the goal locations and expected paths of other agents, how to reach the safe interaction of mobile robots with other dynamic objects in the environment (such as humans and moving obstacles) is still a challenge. In this regard, extensive researches have been conducted on dynamic obstacle avoidance algorithms for mobile robots.

In recent years, learning-based obstacle avoidance strategies for mobile robots have been widely studied. Deep neural networks have been widely used in supervised learning paradigms to train an obstacle avoidance strategy that maps sensor inputs to the robot control commands to assist the robot navigation in the environments with static obstacles. However, similar to other supervised learning methods, this learning strategy is also greatly limited by quality of the label training dataset, and the distribution between the training dataset and the test dataset may not match, which limits the application in the real scenario. To overcome this limitation, the progressive network in transfer learning is introduced in some mobile robot obstacle avoidance methods to realize the multi-environment migration of obstacle avoidance models. However, the test environment is relatively simple and structured, and it is difficult to generalize the learned planner to scenarios with dynamic obstacles. Recently, some distributed multi-robot navigation methods have been proposed for highly-dynamic unstructured environments. However, these navigation methods require complex framework design and extensive online computations, which will increase the perceived uncertainty of the whole system. Moreover, oscillation or freezing phenomenon may occur during the navigation, and it is difficult to guarantee the robot navigation performance under normal conditions. In addition, regarding the real world, the sensor noise and environmental complexity will cause perception errors. To address the uncertainty caused by the perception errors, it is assumed in many navigation and obstacle avoidance methods that the nearby obstacles and environments have been completely observed. However, the existing obstacle avoidance approaches still cannot be safely and efficiently applied to the complex dynamic environment in the real world.

SUMMARY

In view of the deficiencies that the existing obstacle avoidance strategies cannot be safely and efficiently applied to the complex and dynamic real environment, this application provides a dynamic obstacle avoidance method based on real-time local grid map construction.

Technical solutions of this application are described as follows.

This application provides the dynamic obstacle avoidance method based on real-time local grid map construction, including:

(a) acquiring Red-Green-Blue-Depth (RGBD) image data of a real indoor scene by using a RGBD sensor;

(b) inputting the RGBD image data into a trained obstacle detection and semantic segmentation network to extract obstacles of different types and semantic segmentation results in the real indoor scene;

(c) combining the obstacles and semantic segmentation results with an internal parameter of the RGBD sensor and depth information acquired by the RGBD sensor; and generating three-dimension (3D) point cloud data with semantic information under the real indoor scene by using a spatial mapping relationship between two-dimension (2D) and 3D spaces;

(d) according to the 3D point cloud data generated in step (c), extracting state information of a dynamic obstacle followed by inputting to a trained dynamic obstacle trajectory prediction model, and predicting a trajectory of the dynamic obstacle in the real indoor scene;

wherein the step (d) includes:

(d1) determining the state information of the dynamic obstacle; and designing a dynamic obstacle trajectory prediction model and a loss function of the dynamic obstacle trajectory prediction model;

wherein the step (d1) is performed through steps of:

(d11) for a set of dynamic obstacles $\mathcal{R} = \{r_i\}_{i=1 \ldots N}$ currently detected, extracting a trajectory $\mathcal{T}_i = \{(x_1, y_1), (x_2, y_2), \ldots, (x_\tau, y_\tau)\}$ corresponding to an i-th dynamic obstacle in first $\tau$ frames of data; and obtaining state information $\Omega_i := [\mathcal{T}_i \Delta \mathcal{T}_i c\, l\,]^T$ of the i-th dynamic obstacle;

wherein N represents the number of dynamic obstacles in the set of dynamic obstacles; i represents an index of individual dynamic obstacles; $(x_\tau, y_\tau)$ represents a spatial position of the i-th dynamic obstacle in a $\tau$-th frame; $\Delta$ represents a derivative operator; := represents a define symbol; c represents a vector composed of dynamic densities of the i-th dynamic obstacle in individual frames of data, expressed as $c := [c(x_1, y_1), \ldots c(x_\tau, y_\tau)]^T$; $c(x, y)$ represents a dynamic density of the i-th dynamic obstacle in a spatial position $c(x, y)$; and $l$ represents a size of the i-th dynamic obstacle;

(d12) designing the dynamic obstacle trajectory prediction model, wherein the dynamic obstacle trajectory prediction model is formed by three one-dimensional (1D) convolutional layers and three fully-connected (FC) layers connected sequentially; the three 1D convolutional layers have 64, 32, and 32 channels, respectively; each of the three 1D convolutional layers has a kernel size of 3, and a stride of 1; the three FC layers have 256, 128, and 20 channels, respectively; and outputting spatial positions $\{(x_{\tau+1}, y_{\tau+1}), (x_{\tau+2}, y_{\tau+2}), \ldots, (x_{\tau+10}, y_{\tau+10})\}$ of the i-th dynamic obstacle in $(\tau+1)$–$(\tau+10)$ frames after the last layer of the three FC layers; and (d13) based on a real trajectory $\mathcal{T}^{gt}_i$ of the i-th dynamic obstacle, setting the loss function I of the dynamic obstacle trajectory prediction model, expressed as:

$$I = \min_w \|\mathcal{T}^{gt}_i - \Phi(w^T\Omega_i)\|;$$

wherein w represents parameters of the dynamic obstacle trajectory prediction model; $\Phi(w^T\Omega_i)$ represents a prediction trajectory of the i-th dynamic obstacle; and $\mathcal{T}^{gt}_i$ represents a real trajectory of the i-th dynamic obstacle;

(d2) inputting the state information of the dynamic obstacle determined in step (d1) into the dynamic obstacle trajectory prediction model for training, until the loss function I of the dynamic obstacle trajectory prediction model converges, so as to obtain the trained dynamic obstacle trajectory prediction model; and (d3) based on the 3D point cloud data, inputting the state information of the dynamic obstacle determined in step (d1) into the trained dynamic obstacle trajectory prediction model to predict the trajectory of the dynamic obstacle in the real indoor scene;

(e) according to the 3D point cloud data generated in step (c) and the trajectory of the dynamic obstacle predicted in step (d), building a real-time local grid map centered on a mobile robot with a radius of 3 m through steps of:

(e1) allowing the mobile robot to always face toward an east direction of the real-time local grid map; and setting a resolution of the real-time local grid map to 240×240, wherein each grid in the real-time local grid map represents a probability of the existence of an obstacle;

(e2) for a static obstacle in the real indoor scene, filling 1 in a corresponding grid on the real-time local grid map;

(e3) for the dynamic obstacle, filling 1 in a current grid; filling a probability in individual grids covered by a predicted trajectory of the dynamic obstacle based on a distance between individual grids and a position of the dynamic obstacle, wherein the probability of individual grids covered by the predicted trajectory is one minus a ratio of a distance from a grid to a center of the dynamic obstacle to a length of the predicted trajectory(namely, 1-the ratio);

(f) based on the real-time local grid map, building a dynamic obstacle avoidance model based on a deep reinforcement learning framework; and sending a speed instruction to the mobile robot in real time to avoid the obstacles of different types during a navigation process;

wherein the step (f) is performed through steps of:

(f1) determining a state input, an action space and a reward function of the dynamic obstacle avoidance model through steps of:

(f11) determining the state input of the dynamic obstacle avoidance model at moment t, wherein the state input comprises lidar data $l_t$, the real-time local grid map, a position $p_t$ of a navigation target relative to the mobile robot, and an angular velocity $w^{gt}_t$ and a linear velocity $v^{gt}_t$ of the mobile robot; wherein the lidar data $l_t$ is obtained by a lidar sensor of the mobile robot, $l_t \in R^{3\times 360}$, and $R^{3\times 360}$ represents a matrix of 3×360;

(f12) determining the action space at the moment t, wherein the action space comprises moment (t+1) of the mobile robot, and an angular velocity $w_{t+1}$ and a linear velocity $v_{t+1}$ of the mobile robot, wherein $w_{t+1} \in (-0.5, 0.5)$, and $v_{t+1} \in (0.0, 1.0)$; and (f13) building the reward function $r_t = r^p_t + r^c_t + r^n_t + r^w_t$ of the dynamic obstacle avoidance model at the moment t, wherein $r^p_t$ represents a reward of the mobile robot when continuously approaching the navigation target; if the mobile robot reaches the navigation target, $r^p_t = 10.0$, otherwise, $r^p_t = \|x_{t-1} - x_p\| - \|x_t - x_p\|$; $x_{t-1}$ represents a position of the mobile robot in a global coordinate system at moment (t-1); $x_p$ represents a position of the navigation target in the global coordinate system; $x_t$ represents a position of the mobile robot in the global coordinate system at the moment t; $r^c_t$ represents a penalty when the mobile robot encounters a collision, wherein if the collision occurs, $r^c_t = -10.0$, otherwise, $r^c_t = 0.0$; $r^n_t$ represents a penalty when the mobile robot approaches an obstacle, wherein if $d_{th} > d_{ob}$, $r^n_t = -0.1 * \|d_{ob} - d_{th}\|$, otherwise, $r^n_t = 0.0$; $d_{ob}$ represents a current distance between the mobile robot and the obstacle; $d_{th}$ represents a distance threshold; $r^w_t$ represents a penalty when a rotation speed of the mobile robot exceeds a threshold, wherein if $|\Delta w_t| > 0.3$, $r^w_t = -0.1 * \|\Delta w_t\|$, otherwise, $r^w_t = 0.0$; and $\Delta w_t$ represents a difference between the angular velocity $w_{t+1}$ and the angular velocity $w^{gt}_t$, expressed as $\Delta w_t = w_{t+1} - w^{gt}_t$;

(f2) building and training the dynamic obstacle avoidance model until the reward function converges;

(f3) inputting the state input determined in step (f1) into a trained dynamic obstacle avoidance model, and outputting the speed instruction to the mobile robot to avoid the obstacles during the navigation process;

wherein the dynamic obstacle avoidance model based on the deep reinforcement learning framework comprises a first module for extracting features from the lidar data, a second module for extracting features from the real-time local grid map, a third module for extracting features from the relative position of the navigation target to the mobile robot, a fourth module for extracting features from a current speed of the mobile robot, a three-layer perceptron, and a FC layer with three branches;

an output end of the first module, an output end of the second module, an output end of the third module, and an output end of the fourth module are connected to an input end of the three-layer perceptron; and an output end of the three-layer perceptron is connected to the FC layer with three branches;

a first branch of the FC layer is configured to output an average velocity of the mobile robot in two dimensions, and the average velocity comprises an average angular velocity and an average linear velocity; a second branch of the FC layer is configured to output a velocity variance of the mobile robot in two dimensions, and the velocity variance comprises an angular velocity variance and a linear velocity variance; and a third branch of the FC layer is configured to output a dynamic obstacle avoidance evaluation value of one dimension;

the first module is composed of three 1D convolutional layers and one 256-dimensional FC layer connected sequentially; the three 1D convolutional layers have 32, 16 and 16 channels, respectively; each of the three 1D convolutional layers has a kernel size of 3 and a stride of 1;

the second module is composed of three 2D convolutional layers, one 512-dimensional FC layer, and one 256-dimensional FC layer connected sequentially; the three 2D convolutional layers have 64, 64, and 32 channels, respectively; the three 2D convolutional layers have a kernel size of 5×5, 5×5, and 3×3, respectively, and a stride of each of the three 2D convolutional layers is 2; and the third module and the fourth module are each formed by one 32-dimensional FC layer.

In an embodiment, the step (b) includes:

(b1) building an obstacle detection and semantic segmentation network based on Mask and Region-based Convolution Neural Network (R-CNN); and defining a loss function L of the obstacle detection and semantic segmentation network in the real indoor scene, expressed as:

$$L = \min_\theta \left\{ \sum_{i=0}^{N} [L1 - L2 + L3] \right\};$$

wherein N represents the number of Red-Green-Blue (RGB) images in a training batch; i represents an index of an RGB image; θ represents network parameters of the Mask R-CNN; L1 represents an obstacle positioning accuracy error, and $$L1 = \sum_{j=0}^{K} \alpha \| l_{ij} - l_{ij}^{gt} \|_2^2;$$

K represents the number of obstacle types; j is an index of an obstacle type; α represents a weight of an obstacle positioning accuracy in an obstacle detection and semantic segmentation task, and α=0.8; $l_{ij}$ represents a vector of a predicted bounding box for a j-th obstacle on an i-th RGB image, and the vector comprises position and size information of the predicted bounding box; $l_{ij}^{gt}$ represents a vector of a real bounding box for the j-th obstacle on the i-th RGB image, and the vector comprises position and size information of the real bounding box; $\|\ \|_2^2$ represents square of a norm; L2 represents obstacle classification accuracy and L2=β$p_{ij}^{gt}$ log ($q_{ij}$); β represents a weight of the obstacle classification accuracy in the obstacle detection and semantic segmentation task, and β=1; $q_{ij}$ represents a probability of correctly classifying the j-th obstacle on the i-th RGB image by the Mask R-CNN; $p_{ij}^{gt}$ indicates real classification of the j-th obstacle on the i-th RGB image; L3

$$L3 = \sum_{k=0}^{M} \gamma \| f_{ik} - f_{ik}^{gt} \|_2^2;$$

represents an obstacle semantic segmentation accuracy and M represents a total number of pixels on the RGB image; k represents an index of pixels on the i-th RGB image; f represents a semantic category of a k-th pixel on the i-th RGB image predicted by the Mask R-CNN:, $f_{ik}^{gt}$ represents a real semantic of the k-th pixel on the i-th RGB image; γ represents a weight of the obstacle semantic segmentation accuracy in the obstacle detection and semantic segmentation task, and γ=0.5;

(b2) based on Common Object in Context (COCO) dataset, training the obstacle detection and semantic segmentation network until the loss function L converges, so as to obtain the trained obstacle detection and semantic segmentation network; and (b3) inputting the RGBD image data acquired into the trained obstacle detection and semantic segmentation network to extract the obstacles of different types and semantic segmentation results.

In an embodiment, the semantic 3D point cloud data (X, Y, Z) is expressed as:

$$\begin{cases} X = \dfrac{Z(u - x_0)}{f_x} \\ Y = \dfrac{Z(v - y_0)}{f_y} \\ Z = \dfrac{d}{s} \end{cases};$$

wherein (u, v) represents a coordinate of a pixel on an RGB image; d represents a depth value of the pixel on the RGB image; ($x_0$, $y_0$) represents a center coordinate of a RGB image; $f_x$ represents a first focal length in internal parameters of an RGBD vision sensor; $f_y$ represents a second focal length in the internal parameters of the RGBD vision sensor; and s represents a zoom factor.

In an embodiment, the step (f2) is performed through steps of:

(f21) initializing parameters of the dynamic obstacle avoidance model;

(f22) inputting the lidar data $l_t$, the real-time local grid map, the position $p_t$ of the navigation target relative to the mobile robot, the angular velocity $w_t^{gt}$ the linear velocity $v_t^{gt}$ into the dynamic obstacle avoidance model;

(f23) updating the parameters of the dynamic obstacle avoidance model by a stochastic gradient descent (SGD) algorithm; and (f24) training the dynamic obstacle avoidance model with a learning rate of 1e-4 and a momentum set to 0.9 until the reward function converges, so as to complete training of the dynamic obstacle avoidance model.

Compared to the prior art, this application has the following beneficial effects.

To address the decline in navigation safety of the mobile robot caused by scattered distribution of various obstacles in the indoor environment and movement uncertainty of dynamic obstacles, this application proposes a dynamic obstacle avoidance method based on real-time local grid map construction. In the method, the local grid map is constructed in real time, and a dynamic obstacle avoidance model based on deep reinforcement learning framework is established, by which the speed instruction can be sent to the mobile robot in real time to avoid the obstacles during the navigation process, improving the obstacle avoidance safety of the mobile robots.

BRIEF DESCRIPTION OF THE DRAWINGS

The patent or application file contains FIG. 2 executed in color. Copies of this patent or patent application publication with color drawing(s) will be provided by the Office upon request and payment of the necessary fee.

DETAILED DESCRIPTION OF EMBODIMENTS

The disclosure will be further described in detail in conjunction with the accompanying drawings and embodiments.

Compared with the traditional robot navigation obstacle avoidance method, a dynamic obstacle avoidance method based on real-time local grid map construction provided herein can be applied to the complex dynamic environment in the real word, and has high robustness to sensor noise, environmental unknowns, changes in the position of different obstacles in the environment, which provides a safe and efficient dynamic obstacle avoidance method in the navigation process of a mobile robot, and can effectively reduce the difficulty of mobile robot navigation obstacle avoidance and improve the safety of navigation of the mobile robot in the complex dynamic environment.

Figure 1:
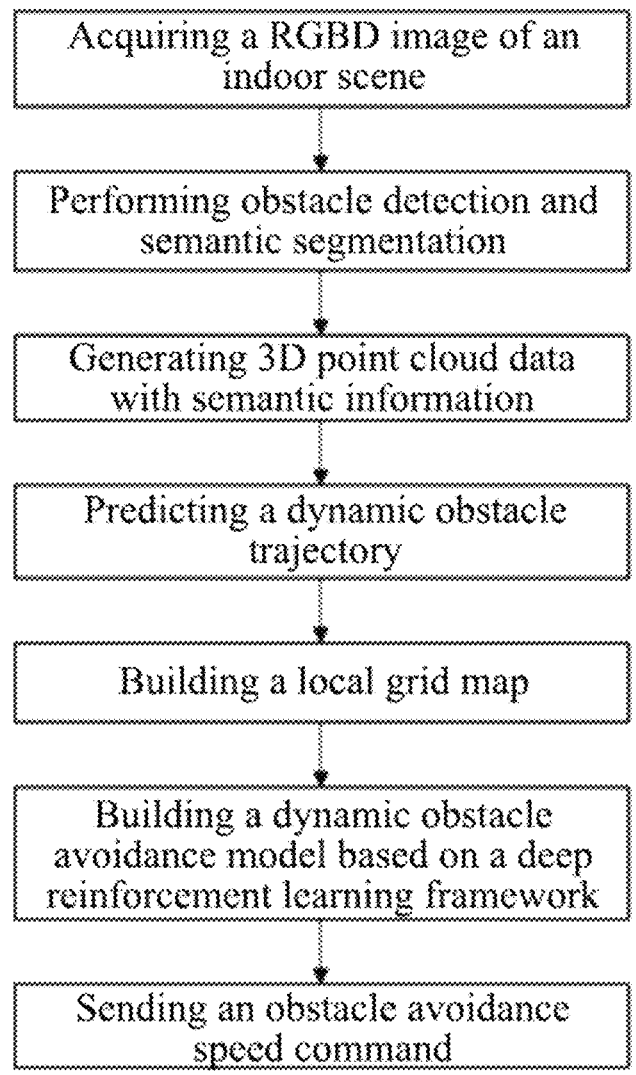
FIG. 1 is a flowchart of a dynamic obstacle avoidance method based on real-time local grid map construction according to one embodiment of the present disclosure.

FIG. 1 shows a flowchart of the dynamic obstacle avoidance method based on real-time local grid map construction including the following steps.

(a) Red-Green-Blue-Depth (RGBD) image data in a real indoor scene is acquired by an Intel RealSense D435 sensor. The Intel RealSense D435 sensor can obtain RGB and depth D image of the indoor scene more accurately.

(b) The acquired RGBD image data is input into a trained obstacle detection and semantic segmentation network to extract obstacles of different types and semantic segmentation results in the real indoor scene.

In this embodiment, the step (b) is performed through the following steps (b1) to (b3).

(b1) An obstacle detection and semantic segmentation network is built based on Mask and Region-based Convolution Neural Network (R-CNN). A loss function L of the obstacle detection and semantic segmentation network in the real indoor scene is defined. In this embodiment, the loss function L needs to improve the positioning accuracy, classification and segmentation accuracy of different obstacles in real indoor scenes. The loss function L is expressed as:

$$L = \min_\theta \left\{ \sum_{i=0}^{N} [L1 - L2 + L3] \right\}.$$

N represents the number of Red-Green-Blue (RGB) images in a training batch. i represents an index of an RGB image. θ represents the network parameters of the Mask R-CNN. L1 represents an obstacle positioning accuracy error, and $$L1 = \sum_{j=0}^{K} \alpha \|l_{ij} - l_{ij}^{gt}\|_2^2;$$

K represents the number of obstacle types. j is an index of an obstacle type. α represents a weight of an obstacle positioning accuracy in an obstacle detection and semantic segmentation task, and α=0.8. $l_{ij}$ represents a vector of a predicted bounding box for a j-th obstacle on an i-th RGB image, and the vector includes position and size information of the predicted bounding box. $l_{ij}^{gt}$ represents a vector of a real bounding box for the j-th obstacle on the i-th RGB image, and the vector includes position and size information of the real bounding box. $\|\ \|_2^2$ represents square of a norm. L2 represents obstacle classification accuracy, and L2=$\beta p_{ij}^{gt}$log ($q_{ij}$). β represents a weight of the obstacle classification accuracy in the obstacle detection and semantic segmentation task, and β=1. $q_{ij}$ represents a probability of correctly classifying the j-th obstacle on the i-th RGB image by the Mask R-CNN. $p_{ij}^{gt}$ indicates real classification of the j-th obstacle on the i-th RGB image. L3

$$L3 = \sum_{k=0}^{M} \gamma \|f_{ik} - f_{ik}^{gt}\|_2^2.$$

represents an obstacle semantic segmentation accuracy and represents a total number of pixels on the RGB image. k represents an index of pixels on the i-th RGB image. $f_{ik}$ represents a semantic category of a k-th pixel on the i-th RGB image predicted by the Mask R-CNN. $f_{ik}^{gt}$ represents a real semantic of the k-th pixel on the i-th RGB image. γ represents a weight of the obstacle semantic segmentation accuracy in the obstacle detection and semantic segmentation task, and γ=0.5.

(b2) Based on Common Object in Context (COCO) dataset, the obstacle detection and semantic segmentation network is trained until the loss function L converges, so as to obtain the trained obstacle detection and semantic segmentation network.

(b3) The acquired RGBD image data is input into the trained obstacle detection and semantic segmentation network to extract the obstacles of different types and semantic segmentation results.

Figure 2:
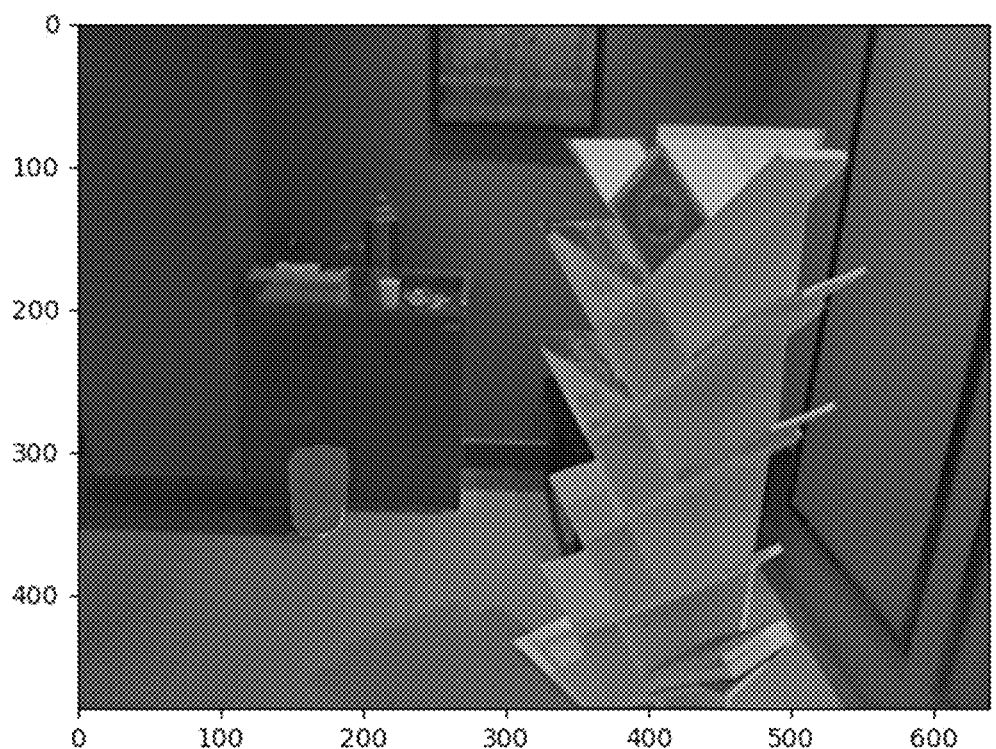
FIG. 2 is a schematic diagram showing results of obstacle detection and semantic segmentation according to one embodiment of the present disclosure.

In this disclosure, the obstacle detection and semantic segmentation network based on Mask R-CNN can detect the location and type information of obstacles in the real scene, which meets the needs of the dynamic obstacle avoidance model of mobile robots. FIG. 2 is a schematic diagram shows the obstacle detection and semantic segmentation results in this disclosure. It can be seen from FIG. 2 that four types of obstacles are detected, namely: a painting, a cabinet, an exhibition shelf, and a trash can, which are consistent with the types of obstacles in the real indoor scene.

(c) The obstacles and semantic segmentation results are combined with an internal parameter of the Intel RealSense D435 sensor and depth information acquired by the Intel RealSense D435 sensor to generate semantic three-dimension (3D) point cloud data with semantic information in the real indoor scene by a spatial mapping relationship between two-dimension (2D) and three-dimension (3D) spaces. The semantic 3D point cloud data (X, Y, Z) is expressed as:

$$\begin{cases} X = \dfrac{Z(u - x_0)}{f_x} \\ Y = \dfrac{Z(v - y_0)}{f_y} \\ Z = \dfrac{d}{s} \end{cases}.$$

(u, v) represents a coordinate of a pixel on the RGB image. d represents a depth value of the pixel on the RGB image. ($x_0$, $y_0$) represents a center coordinate of the RGB image. $f_x$ represents a first focal length in internal parameters of an RGBD vision sensor. $f_y$ represents a second focal length in the internal parameters of the RGBD vision sensor. s represents a zoom factor.

(d) According to the 3D point cloud data, state information of the dynamic obstacle is extracted and input to a trained dynamic obstacle trajectory prediction model to predict a trajectory of the dynamic obstacle in the real indoor scene.

In this embodiment, the step (d) includes the steps (d1) to (d3).

(d1) The state information of the dynamic obstacle is determined, and a dynamic obstacle trajectory prediction model and a loss function of the dynamic obstacle trajectory prediction model are designed.

The step (d1) is performed through steps (d11) to (d13).

(d11) For a set of the dynamic obstacles $\mathcal{R} = \{r_i\}_{i=1\ldots N}$ currently detected, a trajectory $\mathcal{T}_i = \{(x_1, y_1), (x_2, y_2), \ldots, (x_\tau, y_\tau)\}$ corresponding to the i-th dynamic obstacle in the first τ frames of data is extracted. The status information $\Omega_i := [\mathcal{T}_i \ \Delta \mathcal{T}_i \ c \ l]^T$ of the i-th dynamic obstacle is obtained.

Where N represents the number of dynamic obstacles in the set of dynamic obstacles. i represents an index of individual dynamic obstacles. $(x_\tau, y_\tau)$ represents a spatial position of the i-th dynamic obstacle in a τ-th frame. Δ represents a derivative operator. := represents a define symbol. c represents a vector composed of dynamic densities of the i-th dynamic obstacle in individual frames of data, expressed as $c := [c(x_1, y_1), \ldots c(x_{96}, y_{96})]^T$. $c(x, y)$ represents a dynamic density of the i-th dynamic obstacle in a spatial position $c(x, y)$. $l$ represents a size of the i-th dynamic obstacle.

(d12) The dynamic obstacle trajectory prediction model is formed by three one-dimensional (1D) convolutional layers and three fully-connected (FC) layers connected sequentially. The three 1D convolutional layers have 64, 32, and 32 channels, respectively. Each of the three 1D convolutional layers has a kernel size of 3, and a stride of 1. The three FC layers have 256, 128, and 20 channels, respectively, and spatial positions $\{(x_{\tau+1}, y_{\tau+1}), (x_{\tau+2}, y_{\tau+2}), \ldots, (x_{\tau+10}, y_{\tau+10})\}$ of the i-th dynamic obstacle in (τ+1)–(τ+10) frames are output after the last layer of the three FC layers, so as to make the dynamic obstacle trajectory prediction more accurate.

(d13) Based on a real trajectory $\mathcal{T}^{gt}_i$ of the i-th dynamic obstacle, the loss function I of the dynamic obstacle trajectory prediction model is set, wherein the loss function I is expressed as:

$$I = \min_w \|\mathcal{T}^{gt}_i - \phi(w^T \Omega_i)\|.$$

w represents the parameters of the dynamic obstacle trajectory prediction model. $\Phi(w^T\Omega_i)$ represents a prediction trajectory of the i-th dynamic obstacle. $\mathcal{T}^{gt}_i$ represents a real trajectory of the i-th dynamic obstacle.

(d2) The state information of the dynamic obstacle determined in step (d1) is input into the dynamic obstacle trajectory prediction model for training, until the loss function I of the dynamic obstacle trajectory prediction model converges, so as to obtain the trained dynamic obstacle trajectory prediction model.

(d3) Based on the 3D point cloud data, the state information of the dynamic obstacle determined in step (d1) is input into the trained dynamic obstacle trajectory prediction model to predict the trajectory of the dynamic obstacle in the real indoor scene, thereby helping the mobile robot understand the movement intention of the dynamic obstacle in the scene, so as to improve the safety of the mobile robot dynamic obstacle avoidance.

(e) According to the 3D point cloud data generated in step (c) and the trajectory of the dynamic obstacle predicted in step (d), a real-time local grid map centered on a mobile robot with a radius of 3 m is built. If the radius of the real-time local grid map is too small, the mobile robot will not have enough time to avoid obstacles. If the radius of the real-time local grid map is too large, the trajectory prediction accuracy of the mobile robot for dynamic obstacles is low. Specifically, the step (e) is performed by the steps (e1) to (e3).

(e1) The mobile robot always faces toward an east direction of the real-time local grid map. A resolution of the real-time local grid map is set to 240×240. Each grid in the real-time local grid map represents a probability of existence of an obstacle.

(e2) For a static obstacle in the real indoor scene, 1 is filled in the corresponding grid on the real-time local grid map.

(e3) For the dynamic obstacle, 1 is filled in a current grid. Based on a distance between individual grids and a position of the dynamic obstacle, a probability is filled in individual grids covered by a predicted trajectory of the dynamic obstacle. The probability of individual grids covered by the predicted trajectory is one minus a ratio of a distance from a grid to a center of the dynamic obstacle to a length of the predicted trajectory. The method in the disclosure helps the mobile robots understand the moving intent of dynamic obstacles in indoor scenes by establishing a real-time local grid map, thereby improving the safety of dynamic obstacle avoidance of mobile robots.

(f) Based on the real-time local grid map, a dynamic obstacle avoidance model based on a deep reinforcement learning framework is built. A real-time speed instruction is sent to the mobile robot in real time to avoid the obstacles of different types during a navigation process.

Specifically, the step (f) is performed through the steps (f1) to (f3).

(f1) A state input, an action space and a reward function of the dynamic obstacle avoidance model of the mobile robot are determined through steps (f11) to (f13).

(f11) At moment t, the state input of the dynamic obstacle avoidance model is determined. The state input includes lidar data $l_t$, the real-time local grid map, a position $p_t$ of a navigation target relative to the mobile robot, and an angular velocity $w^{gt}_t$ and a linear velocity $v^{gt}_t$ of the mobile robot. The lidar data $l_t$ is obtained by a lidar sensor of the mobile robot, $l_t \in R^{3\times360}$, and $R^{3\times360}$ represents a matrix of 3×360. The above state input is determined to provide more comprehensive local environment information and mobile robot status information and improve the accuracy of dynamic obstacle avoidance model decision-making.

(f12) At moment t, the action space includes moment (t+1) of the mobile robot, and an angular velocity $w_{t+1}$ and a linear velocity $v_{t+1}$ of the mobile robot wherein $w_{t+1} \in (-0.5, 0.5)$, and $v_{t+1} \in (0.0, 1.0)$. If the angular velocity or linear velocity of the mobile robot is too small, the navigation efficiency of the mobile robot will be reduced. If the angular velocity or linear velocity of the mobile robot is too large, the safety of the mobile robot during moving will be reduced.

(f13) The reward function $r_t = r^p_t + r^c_t + r^n_t + r^w_t$ of the dynamic obstacle avoidance model of the mobile robot at moment t is built. $r^p_t$ represents a reward of the mobile robot when continuously approaching the navigation target. If the mobile robot reaches the navigation target, $r^p_t = 10.0$, otherwise, $r^p_t = \|x_{t-1} - x_p\| - \|x_t - x_p\|$. $x_{t-1}$ represents a position of the mobile robot in a global coordinate system at moment (t−1). $x_p$ represents a position of the navigation target in the global coordinate system. $x_t$ represents a position of the mobile robot in the global coordinate system at the moment t. $r^c_t$ represents a penalty when the mobile robot encounters a collision. If the collision occurs, $r^c_t = -10.0$, otherwise, $r^c_t = 0.0$. $r^n_t$ represents a penalty when the mobile robot approaches an obstacle, wherein if $d_{th} > d_{ob}$, $r^n_t = -0.1 * \|d_{ob} - d_{th}\|$, otherwise, $r^n_t = 0.0$. $d_{ob}$ represents a current distance between the mobile robot and the obstacle. $d_{th}$ represents a distance threshold. $r^w_t$ represents a penalty when a rotation speed of the mobile robot exceeds a threshold, wherein if $|\Delta w_t| > 0.3$, $r^w_t = -0.1 * \|\Delta w_t\|$, otherwise, $r^w_t = 0.0$. $\Delta w_t$ represents a difference between the angular velocity $w_{t+1}$ and the angular velocity $w_t^{gt}$, expressed as $\Delta w_t = w_{t+1} - w_t^{gt}$. The reward function can help the mobile robot learn a safer and more effective obstacle avoidance strategy.

(f2) The dynamic obstacle avoidance model is built and trained based on the deep reinforcement learning framework until the reward function of the mobile robot converges, and the dynamic obstacle avoidance model is completely trained.

In this embodiment, the step (f2) is performed through steps (f21) to (f25).

(f21) Parameters of the dynamic obstacle avoidance model is initialized.

(f22) The lidar data $l_t$, the real-time local grid map, the position $p_t$ of the navigation target relative to the mobile robot, and the angular velocity $w_t^{gt}$ and the linear velocity $v_t^{gt}$ of the mobile robot are inputted into the dynamic obstacle avoidance model.

(f23) The parameters of the dynamic obstacle avoidance model are updated by a stochastic gradient descent (SGD) method.

(f24) A learning rate of 1e-4 and a momentum of 0.9 are set.

(f25) The training is carried out until the reward function converges to complete the training of the dynamic obstacle avoidance model.

(f3) The state input determined in step (f1) is input into a trained dynamic obstacle avoidance model, and the speed instruction is output to the mobile robot to avoid the obstacles during the navigation process.

Figure 3:
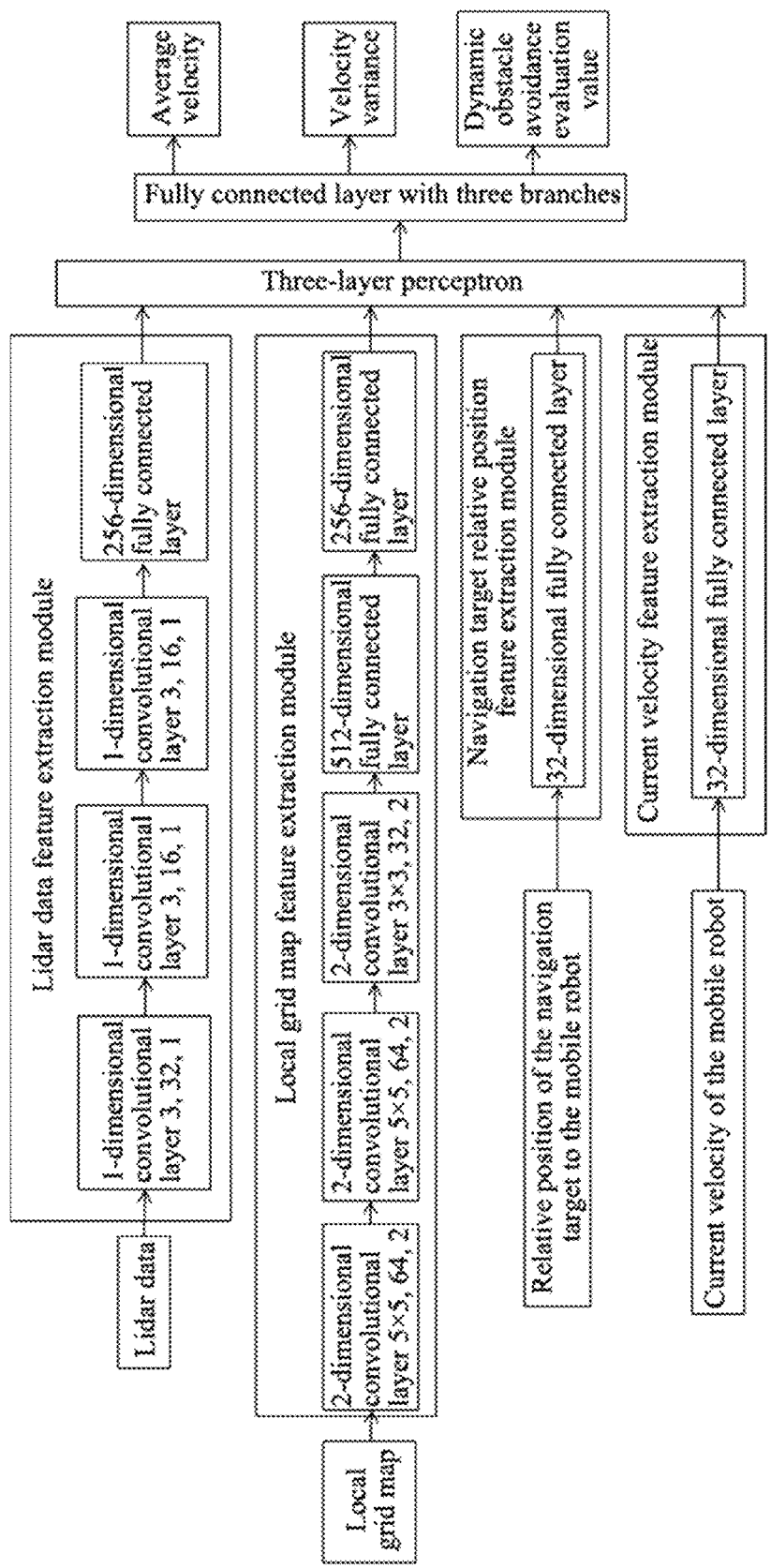
FIG. 3 is a schematic diagram showing a framework of a dynamic obstacle avoidance model according to one embodiment of the present disclosure.

As shown in FIG. 3, the dynamic obstacle avoidance model based on the deep reinforcement learning framework includes a first module for extracting features from the lidar data, a second module for extracting features from the real-time local grid map, a third module for extracting features from the relative position of the navigation target to the mobile robot, a fourth module for extracting features from a current speed of the mobile robot, a three-layer perceptron, and a FC layer with three branches.

An output end of the first module, an output end of the second module, an output end of the third module, and an output end of the fourth module are connected to an input end of the three-layer perceptron. An output end of the three-layer perceptron is connected to the FC layer with three branches.

A first branch of the FC layer is configured to output an average velocity of the mobile robot in two dimensions. The average velocity includes an average angular velocity and an average linear velocity. A second branch of the FC layer is configured to output a velocity variance of the mobile robot in two dimensions. The velocity variance includes an angular velocity variance and a linear velocity variance. A third branch of the FC layer is configured to output a dynamic obstacle avoidance evaluation value of one dimension.

The first module is used to extract high-dimensional features of lidar data, which is composed of three 1D convolutional layers and one 256-dimensional FC layer connected sequentially. The three 1D convolutional layers have 32, 16 and 16 channels, respectively. Each of the three 1D convolutional layers has a kernel size of 3 and a stride of 1.

The second module is used to extract the high-dimensional features of the local grid map, which is composed of three 2D convolutional layers, one 512-dimensional FC layer, and one 256-dimensional FC layer connected sequentially. The three 2D convolutional layers have 64, 64, and 32 channels, respectively; the three 2D convolutional layers have a kernel size of 5×5, 5×5, and 3×3, respectively, and a stride of each of the three 2D convolutional layers is 2. The method in the disclosure sets the first module and the second module, thereby better extracting local environmental information centered on mobile robots.

The third module is used to extract the high-dimensional features of the relative position of the navigation target to the current mobile robot. The fourth module is used to extract the high-dimensional features of the current speed of the mobile robot. The third module and the fourth module are each formed by one 32-dimensional FC layer, which can better extract the current state information of the mobile robot.

The dynamic obstacle avoidance method based on real-time local grid map construction is applied in the real complex dynamic scene. The mobile robot can accurately perceive the surrounding environment information and analyze the intention of the dynamic obstacle, achieving safe and effective obstacle avoidance.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the present claims.

What is claimed is:

1. A dynamic obstacle avoidance method based on real-time local grid map construction, comprising:
   (a) acquiring Red-Green-Blue-Depth (RGBD) image data of a real indoor scene by using a RGBD sensor;
   (b) inputting the RGBD image data into a trained obstacle detection and semantic segmentation network to extract obstacles of different types and semantic segmentation results in the real indoor scene;
   (c) combining the obstacles and semantic segmentation results with an internal parameter of the RGBD sensor and depth information acquired by the RGBD sensor; and generating three-dimension (3D) point cloud data with semantic information under the real indoor scene by using a spatial mapping relationship between two-dimension (2D) and 3D spaces;
   (d) according to the 3D point cloud data generated in step (c), extracting state information of a dynamic obstacle followed by inputting to a trained dynamic obstacle trajectory prediction model, and predicting a trajectory of the dynamic obstacle in the real indoor scene;
   wherein the step (d) comprises:
   (d1) determining the state information of the dynamic obstacle; and designing a dynamic obstacle trajectory prediction model and a loss function of the dynamic obstacle trajectory prediction model;
   wherein the step (d1) is performed through steps of:
   (d11) for a set of dynamic obstacles $\mathcal{R} = \{r_i\}_{i=1 \ldots N}$ currently detected, extracting a trajectory $\mathcal{T}_i = \{(x_1, y_1), (x_2, y_2), \ldots, (x_\tau, y_\tau)\}$ corresponding to an i-th dynamic obstacle in first $\tau$ frames of data; and obtaining state information $\Omega_i := [\mathcal{T}_i, \Delta\mathcal{T}_i, c, 1]^T$ of the i-th dynamic obstacle;
   wherein N represents the number of dynamic obstacles in the set of dynamic obstacles; i represents an index of individual dynamic obstacles; $(x_\tau, y_\tau)$ represents a spatial position of the i-th dynamic obstacle in a $\tau$-th frame; $\Delta$ represents a derivative operator; := represents a define symbol; c represents a vector composed of dynamic densities of the i-th dynamic obstacle in individual frames of data, expressed as $c := [c(x_1, y_1), \ldots c(x_\tau, y_\tau)]^T$; $c(x,y)$ represents a dynamic density of the i-th dynamic obstacle in a spatial position c(x,y); and l represents a size of the i-th dynamic obstacle;

(d12) designing the dynamic obstacle trajectory prediction model, wherein the dynamic obstacle trajectory prediction model is formed by three one-dimensional (1D) convolutional layers and three fully-connected (FC) layers connected sequentially; the three 1D convolutional layers have 64, 32, and 32 channels, respectively; each of the three 1D convolutional layers has a kernel size of 3, and a stride of 1; the three FC layers have 256, 128, and 20 channels, respectively; and outputting spatial positions $\{(x_{\tau+1},y_{\tau+1}), (x_{\tau+2},y_{\tau+2}),\ldots,(x_{\tau+10},y_{\tau+10})\}$ of the i-th dynamic obstacle in $(\tau+1)-(\tau+10)$ frames after the last layer of the three FC layers; and (d13) based on a real trajectory $\mathcal{T}^{gt}_i$ of the i-th dynamic obstacle, setting the loss function I of the dynamic obstacle trajectory prediction model, expressed as:

$$I = \min_{w} \left\| \mathcal{T}^{gt}_i - \phi(w^T \Omega_i) \right\|;$$

wherein w represents parameters of the dynamic obstacle trajectory prediction model; $\phi(w^T\Omega_i)$ represents a prediction trajectory of the i-th dynamic obstacle; and $\mathcal{T}^{gt}_i$ represents a real trajectory of the i-th dynamic obstacle;

(d2) inputting the state information of the dynamic obstacle determined in step (d1) into the dynamic obstacle trajectory prediction model for training, until the loss function I of the dynamic obstacle trajectory prediction model converges, so as to obtain the trained dynamic obstacle trajectory prediction model; and (d3) based on the 3D point cloud data, inputting the state information of the dynamic obstacle determined in step (d1) into the trained dynamic obstacle trajectory prediction model to predict the trajectory of the dynamic obstacle in the real indoor scene;

(e) according to the 3D point cloud data generated in step (c) and the trajectory of the dynamic obstacle predicted in step (d), building a real-time local grid map centered on a mobile robot with a radius of 3 m through steps of:

(e1) allowing the mobile robot to always face toward an east direction of the real-time local grid map; and setting a resolution of the real-time local grid map to 240×240, wherein each grid in the real-time local grid map represents a probability of the existence of an obstacle;

(e2) for a static obstacle in the real indoor scene, filling 1in a corresponding grid on the real-time local grid map;

(e3) for the dynamic obstacle, filling 1 in a current grid; filling a probability in individual grids covered by a predicted trajectory of the dynamic obstacle based on a distance between individual grids and a position of the dynamic obstacle, wherein the probability of individual grids covered by the predicted trajectory is one minus a ratio of a distance from a grid to a center of the dynamic obstacle to a length of the predicted trajectory;

(f) based on the real-time local grid map, building a dynamic obstacle avoidance model based on a deep reinforcement learning framework; and sending a speed instruction to the mobile robot in real time to avoid the obstacles of different types during a navigation process;

wherein the step (f) is performed through steps of:

(f1) determining a state input, an action space and a reward function of the dynamic obstacle avoidance model through steps of:

(f11) determining the state input of the dynamic obstacle avoidance model at moment t, wherein the state input comprises lidar data $l_t$, the real-time local grid map, a position $p_t$ of a navigation target relative to the mobile robot, and an angular velocity $w_t^{gt}$ and a linear velocity $v_t^{gt}$ of the mobile robot; wherein the lidar data $l_t$ is obtained by a lidar sensor of the mobile robot, $l_t \in R^{3\times 360}$, and $R^{3\times 360}$ represents a matrix of 3×360;

(f12) determining the action space at the moment t, wherein the action space comprises moment (t+1) of the mobile robot, and an angular velocity $w_{t+1}$ and a linear velocity $v_{t+1}$ of the mobile robot, wherein $w_{t+1} \in (-0.5, 0.5)$, and $v_{t+1} \in (0.0, 1.0)$; and (f13) building the reward function $r_t = r_t^p + r_t^c + r_t^n + r_t^w$ of the dynamic obstacle avoidance model at the moment t, wherein $r_t^p$ represents a reward of the mobile robot when continuously approaching the navigation target; if the mobile robot reaches the navigation target, $r_t^p = 10.0$, otherwise, $r_t^p = \|x_{t-1} - x_p\| - \|x_t - x_p\|$; $x_{t-1}$ represents a position of the mobile robot in a global coordinate system at moment (t−1); $x_p$ represents a position of the navigation target in the global coordinate system; $x_t$ represents a position of the mobile robot in the global coordinate system at the moment t; $r_t^c$ represents a penalty when the mobile robot encounters a collision, wherein if the collision occurs, $r_t^c = -10.0$, otherwise, $r_t^c = 0.0$; $r_t^n$ represents a penalty when the mobile robot approaches an obstacle, wherein if $d_{th} > d_{ob}$, $r_t^n = -0.1 * \|d_{ob} - d_{th}\|$, otherwise, $r_t^n = 0.0$; $d_{ob}$ represents a current distance between the mobile robot and the obstacle; $d_{th}$ represents a distance threshold; $r_t^w$ represents a penalty when a rotation speed of the mobile robot exceeds a threshold, wherein if $|\Delta w_t| > 0.3$, $r_t^w = -0.1 * \|\Delta w_t\|$, otherwise, $r_t^w = 0.0$; and $\Delta w_t$ represents a difference between the angular velocity $w_{t+1}$ and the angular velocity $w_t^{gt}$, expressed as $\Delta w_t = w_{t+1} - w_t^{gt}$;

(f2) building and training the dynamic obstacle avoidance model until the reward function converges;

(f3) inputting the state input determined in step (f11) into a trained dynamic obstacle avoidance model, and outputting the speed instruction to the mobile robot to avoid the obstacles during the navigation process;

wherein the dynamic obstacle avoidance model based on the deep reinforcement learning framework comprises a first module for extracting features from the lidar data, a second module for extracting features from the real-time local grid map, a third module for extracting features from a relative position of the navigation target to the mobile robot, a fourth module for extracting features from a current speed of the mobile robot, a three-layer perceptron, and a FC layer with three branches;

an output end of the first module, an output end of the second module, an output end of the third module, and an output end of the fourth module are connected to an input end of the three-layer perceptron; and an output end of the three-layer perceptron is connected to the FC layer with three branches;

a first branch of the FC layer is configured to output an average velocity of the mobile robot in two dimensions, and the average velocity comprises an average angular velocity and an average linear velocity; a second branch of the FC layer is configured to output a velocity variance of the mobile robot in two dimensions, and the velocity variance comprises an angular velocity variance and a linear velocity variance; and a third branch of the FC layer is configured to output a dynamic obstacle avoidance evaluation value of one dimension;

the first module is composed of three 1D convolutional layers and one 256-dimensional FC layer connected sequentially; the three 1D convolutional layers have 32, 16 and 16 channels, respectively; each of the three 1D convolutional layers has a kernel size of 3 and a stride of 1;

the second module is composed of three 2D convolutional layers, one 512-dimensional FC layer, and one 256-dimensional FC layer connected sequentially; the three 2D convolutional layers have 64, 64, and 32 channels, respectively; the three 2D convolutional layers have a kernel size of 5×5, 5×5, and 3×3, respectively, and a stride of each of the three 2D convolutional layers is 2; and the third module and the fourth module are each formed by one 32-dimensional FC layer.

2. The dynamic obstacle avoidance method of claim 1, wherein the step (b) comprises:

(b1) building an obstacle detection and semantic segmentation network based on Mask and Region-based Convolution Neural Network (R-CNN); and defining a loss function L of the obstacle detection and semantic segmentation network in the real indoor scene, expressed as:

$$L = \min_\theta \left\{ \sum_{i=0}^{N} [L1 - L2 + L3] \right\};$$

wherein N represents the number of Red-Green-Blue (RGB) images in a training batch; i represents an index of an RGB image; θ represents network parameters of the Mask R-CNN; L1 represents an obstacle positioning accuracy error, and $$L1 = \sum_{j=0}^{K} \alpha \|l_{ij} - l_{ij}^{gt}\|_2^2;$$

K represents the number of obstacle types; j is an index of an obstacle type; α represents a weight of an obstacle positioning accuracy in an obstacle detection and semantic segmentation task, and α=0.8; $l_{ij}$ represents a vector of a predicted bounding box for a j-th obstacle on an i-th RGB image, and the vector comprises position and size information of the predicted bounding box; $l_{ij}^{gt}$ represents a vector of a real bounding box for the j-th obstacle on the i-th RGB image, and the vector comprises position and size information of the real bounding box; $\|\ \|_2^2$ represents square of a norm; L2 represents obstacle classification accuracy and L2=$\beta p_{ij}^{gt}$ log ($q_{ij}$); β represents a weight of the obstacle classification accuracy in the obstacle detection and semantic segmentation task, and β=1; $q_{ij}$ represents a probability of correctly classifying the j-th obstacle on the i-th RGB image by the Mask R-CNN; $p_{ij}^{gt}$ indicates real classification of the j-th obstacle on the i-th RGB image; L3 represents $$L3 = \sum_{k=0}^{M} \gamma \|f_{ik} - f_{ik}^{gt}\|_2^2;$$

an obstacle semantic segmentation accuracy and represents a total number of pixels on the RGB image; k represents an index of pixels on the i-th RGB image; $f_{ik}$ represents a semantic category of a k-th pixel on the i-th RGB image predicted by the Mask R-CNN; $f_{ik}^{gt}$ represents a real semantic of the k-th pixel on the i-th RGB image; γ represents a weight of the obstacle semantic segmentation accuracy in the obstacle detection and semantic segmentation task, and γ=0.5;

(b2) based on Common Object in Context (COCO) dataset, training the obstacle detection and semantic segmentation network until the loss function L converges, so as to obtain the trained obstacle detection and semantic segmentation network; and (b3) inputting the RGBD image data acquired into the trained obstacle detection and semantic segmentation network to extract the obstacles of different types and semantic segmentation results.

3. The dynamic obstacle avoidance method of claim 1, wherein the semantic 3D point cloud data (X, Y, Z) is expressed as:

$$\begin{cases} X = \dfrac{Z(u - x_0)}{f_x} \\ Y = \dfrac{Z(v - y_0)}{f_y} \\ Z = \dfrac{d}{s} \end{cases};$$

wherein (u, v) represents a coordinate of a pixel on an RGB image; d represents a RGBD value of the pixel on the RGB image; ($x_0$, $y_0$) represents a center coordinate of a RGBD image; $f_x$ represents a first focal length in internal parameters of an RGBD vision sensor; $f_y$ represents a second focal length in the internal parameters of the RGBD vision sensor; and s represents a zoom factor.

4. The dynamic obstacle avoidance method of claim 1, wherein the step (f2) is performed through steps of:

(f21) initializing parameters of the dynamic obstacle avoidance model;

(f22) inputting the lidar data $l_t$, the real-time local grid map, the position $p_t$ of the navigation target relative to the mobile robot, the angular velocity $w_t^{gt}$ and the linear velocity $v_t^{gt}$ into the dynamic obstacle avoidance model;

(f23) updating the parameters of the dynamic obstacle avoidance model by a stochastic gradient descent (SGD) algorithm; and (f24) training the dynamic obstacle avoidance model with a learning rate of 1e-4 and a momentum set to 0.9 until the reward function converges, so as to complete training of the dynamic obstacle avoidance model.

* * * * *